United States Patent [19]
Zimmer

[11] 3,804,011
[45] Apr. 16, 1974

[54] ROLLER SQUEEGEE WITH RESILIENT TEETH TO INCREASE LIQUID PENETRATION

[76] Inventor: Peter Zimmer, Unter Sparchen 54, 6330 Kufstein, Austria

[22] Filed: Mar. 5, 1971

[21] Appl. No.: 121,475

[30] Foreign Application Priority Data
Mar. 9, 1970  Austria .............................. 2164/70
May 15, 1970  Austria .............................. 4422/70

[52] U.S. Cl. .................. 101/120, 101/114, 101/124
[51] Int. Cl. ...................... B41f 15/40, B41f 15/44
[58] Field of Search .......... 101/119, 116, 120, 129, 101/124, 115, 123, 121, 122; 156/277, 29; 15/179, 187, 188; 401/206, 220, 218; 29/120, 121; 68/202, 13 R; 418/103, 154, 230.14, 230.16, 152, 153, 156; 118/212, 259, 261, 262; 416/240

[56] References Cited
UNITED STATES PATENTS

| | | | |
|---|---|---|---|
| 2,203,974 | 6/1940 | Weinhardt | 418/154 |
| 2,332,411 | 10/1943 | Swanson et al. | 418/156 |
| 2,616,374 | 11/1952 | Carson | 418/154 |
| 2,659,313 | 11/1953 | Carson | 418/154 |
| 2,669,188 | 2/1954 | McIntyre | 416/240 UX |
| 3,053,190 | 9/1962 | Carlson | 418/154 |
| 2,531,036 | 11/1950 | Goettsch | 118/212 |
| 2,664,050 | 12/1953 | Abresch | 418/154 |
| 2,929,088 | 3/1960 | Wier, Jr. | 15/188 X |
| 3,303,791 | 2/1967 | Doble | 418/154 |
| 945,267 | 1/1910 | Dick | 101/120 |
| 2,787,026 | 4/1957 | White | 29/120 X |
| 3,411,931 | 11/1968 | Burns et al. | 29/120 X |
| 2,753,794 | 8/1956 | Groak | 101/120 X |
| 2,866,992 | 1/1959 | Toulmin | 401/208 X |
| 2,965,020 | 12/1960 | Zimmer | 101/123 |
| 3,193,868 | 8/1965 | Cassidy | 401/218 X |
| 2,419,695 | 4/1947 | Shuttleworth et al. | 101/119 |
| 3,368,482 | 2/1968 | Lusher et al. | 101/119 X |
| 3,456,584 | 8/1969 | Moskowitz | 101/119 |
| 1,522,653 | 1/1925 | Smoleroff | 101/120 |
| 3,592,132 | 8/1971 | Weber | 101/119 |
| 3,566,784 | 3/1971 | Mitter | 101/120 |
| 3,596,595 | 8/1971 | Zimmer | 101/120 |
| 3,183,831 | 5/1965 | Zimmer | 101/115 |
| 3,216,349 | 11/1965 | Kraft | 101/124 X |

FOREIGN PATENTS OR APPLICATIONS

| | | | |
|---|---|---|---|
| 376,036 | 4/1964 | Switzerland | 401/208 |
| 762,627 | 4/1934 | France | 101/119 |
| 478,667 | 11/1969 | Switzerland | 101/120 |

*Primary Examiner*—Robert E. Pulfrey
*Assistant Examiner*—R. E. Suter
*Attorney, Agent, or Firm*—Wenderoth, Lind & Ponack

[57] ABSTRACT

A roller squeegee has on the outer peripheral surface thereof teeth made of a material which is elastically deformable under the effect of contact pressure. The teeth extend substantially in the longitudinal direction of the roller squeegee. The centerlines of the cross section of the teeth of the roller squeegee are inclined to the radial direction of the roller squeegee.

5 Claims, 3 Drawing Figures

ROLLER SQUEEGEE WITH RESILIENT TEETH TO INCREASE LIQUID PENETRATION

BACKGROUND OF THE INVENTION

This invention relates to a roller squeegee having teeth of material being elastically deformable under the effect of contact pressure. The teeth extend substantially in the longitudinal direction of the roller squeegee.

Squeegee devices with roller squeegees are used, for the most part, in screen printing, whereby the roller squeegee rolls under pressure along the inside wall of a screen, thus pressing the dye onto the material to be printed. Squeegee devices with roller squeegees can also be used, e.g., in coating processes, for directly applying a liquid, particularly a viscous substance, onto a surface.

Roller squeegees, the surfaces of which preferably consist of elastic material, and have protrusions or recesses therein, are known. These recesses may contain ye dye may have the form of straight or zigzagged grooves on the surface of the squeegee, such grooves extending parallel to the axis of the roller squeegee.

SUMMARY OF THE INVENTION

It is an object of the invention to reduce the force transmitted onto the surface of the material so that the material to be printed is less strongly compressed, and to thereby facilite penetration. This is of particular importance when pile goods, e.g., carpets, are either to be printed by means of pattern screen or dyed by means of a squeegee roller without using a screen, particularly when the dye is of high viscosity, since it is essential in both cases that the dye penetrates into the depth of the pile down to the bottom of the material.

This is achieved, according to the invention, in that the centerline of the cross section of each of the teeth of the roller squeegee is included with respect to the radial direction of the roller squeegee.

The essential advantage resulting from an inclination from the radial direction of the roller of the teeth lies in that much less force is required for the deformation or deflection of the teeth. This means that squeezing out of the dye from the gaps between the teeth requires less force. By reducing the force transmitted onto the surface to be printed, the material to be printed is furthermore less strongly compressed, so that penetration of the dye into the material is much facilitated.

It is useful in this connection to construct the teeth of the squeegee roller such that the two flanks or side walls of each tooth are inclined relative to the radial direction are of the roller and are substantially parallel to each other. The distance between adjacent teeth at the bottoms thereof is greater than the thickness of the teeth, such distance and thickness being measured in the circumferential direction of the roller squeegee. This distance is approximately equal to the height of the teeth. Thus relatively large tooth gap chambers for receiving dye or coating compound are formed, these gap members being enclosed by the teeth of the squeegee roller. In the region of contact between the roller and the screen or material to be dyed, the teeth are tilted down as a whole by bending at their base, whereby a complete squeezing out of the dye or the coating compound is achieved.

Although the teeth preferably should run essentially parallel to the axis of the roller, the teeth may be curved and/or run helically, the angle to the cross-section of the roller, however, being less than 45°.

An embodiment of the invention is hereinafter described in detail with reference to the accompanying drawings, without being limited thereto.

DETAILED DESCRIPTION OF THE DRAWINGS

DETAILED DESCRIPTION OF THE INVENTION

Figure 1:
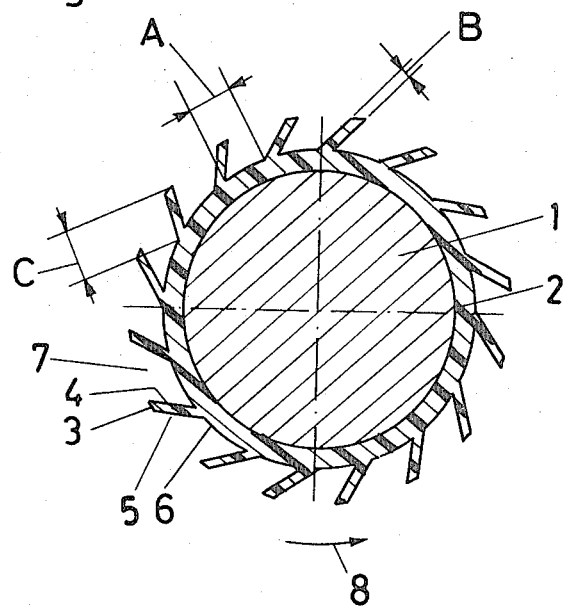
FIG. 1 is a cross-section of a roller squeegee according to the invention.
Figure 2:
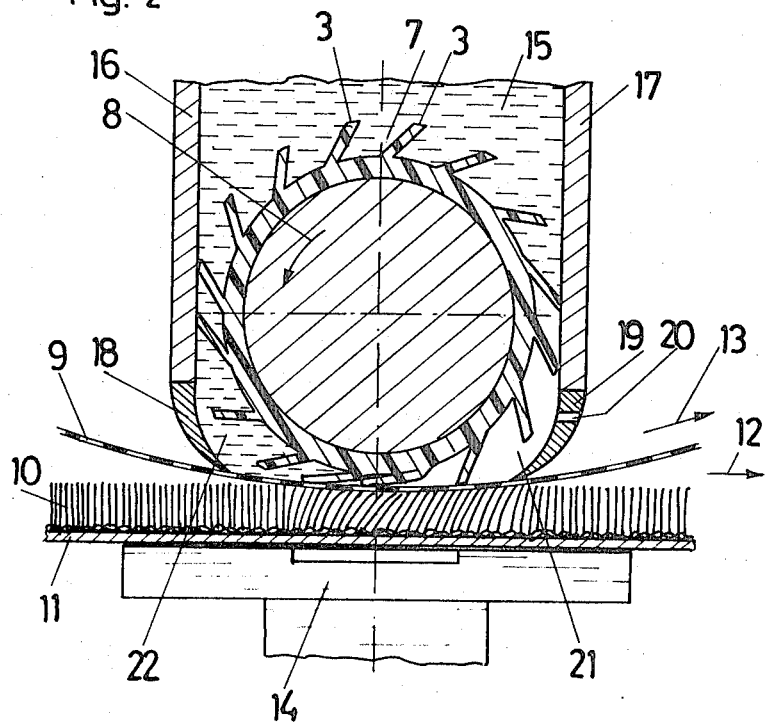
FIG. 2 shows the use of a roller squeegee according to FIG. 1 in a rotary screen of a screen printing machine.

The roller squeegee according to FIGS. 1 and 2 consists of a core 1 of solid magnetizable material resistant to bending, e.g., of steel, and of a coating 2 with teeth 3 of elastically deformable material, e.g., elastomeric material. The teeth extend substantially in the longitudinal direction of the roller squeegee.

The two tooth side walls 4, 5, of each tooth 3 which are inclined relative to the radial direction of the roller are substantially parallel. Adjacent teeth are spaced a distance A at the bottoms (6) of the teeth. Distance A wider than the tooth thickness B. Furthermore the height of the teeth C is approximately equal to the distance A between the teeth. The teeth 3 thus define relatively large tooth chamber gaps 7. The teeth are inclined with respect to the radial direction of the roller such that the bottoms thereof are leading and the tips thereof are trailing with respect to the direction of rotation 8 of the squeegee.

The effect of the roller squeegee according to the invention is shown in FIG. 2. According to FIG. 2 the roller squeegee is positioned within a rotary screen 9 of a screen printing machine. Under the rotary screen 9 the mateiral 10 to be printed — a piled good — is continuously moved with a printing blanket 11 in the direction of arrow 12 while the rotary screen 9 rotates in the direction of arrow 13 and the roller squeegee rolls on the inside wall of the screen in the direction of rotation 8. A magnet body is arranged in the base support 14, thereby causing the squeegee to be pressed against the inside wall of the screen. The dye is contained in chamber 15 enclosed by walls 16, 17 and by end walls (not shown in the drawing). The bottom parts of walls 16 and 17 are provided with sealing lips 18 and 19. sealing lip 19 situated behind the roller squeegee has openings 20 to allow air to pass therethrough. Zone 21 is thus in communication with the atmosphere and the formation therein of a vacuum is prevented. A vacuum in chamber 21 would tend to cause the dye to enter chamber 21.

In the upper half of the roller squeegee the tooth gap chambers 7 between the teeth 3 are filled with dye. The dye in these tooth gap chambers 7 is transported to zone 22 upon rotation of the roller squeegee. In the zone where the teeth 3 contact the inside wall of the screen the teeth 3 are deformed, i.e., they are bent as shown in the drawing, whereby the dye is completely pressed out of the tooth gap chambers 7 and penetrates under pressure through the openings of screen 9 into the material 10.

Figure 3:
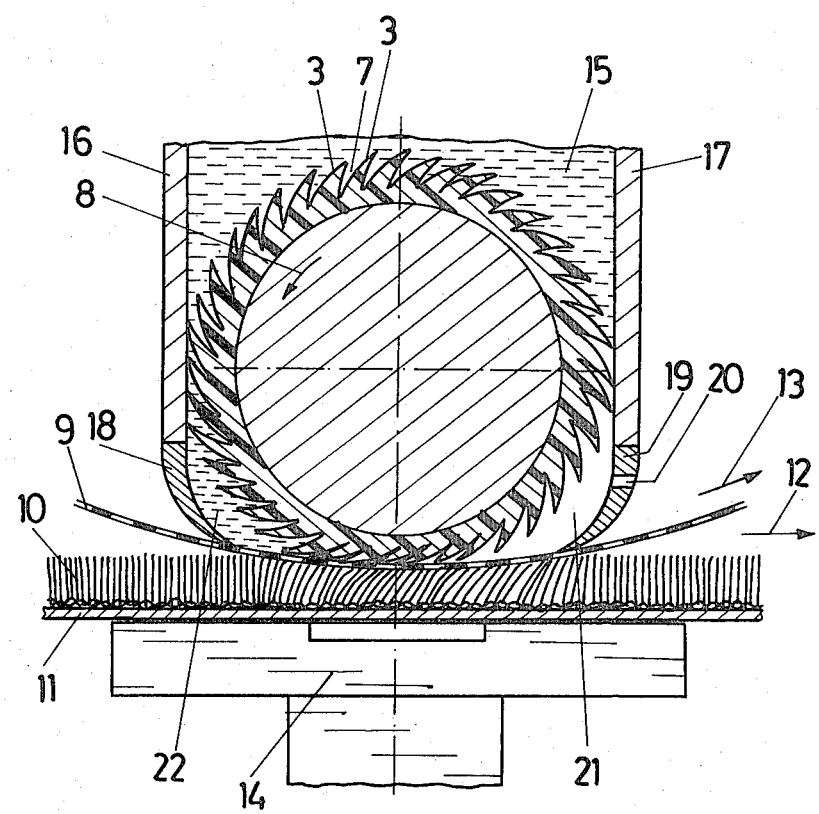
FIG. 3 illustrates another embodiment of the roller squeegee according to the invention again used in a rotary screen.

FIG. 3 shows a roller squeegee consisting of a core and a coating with teeth 3 of elastically deformable material, the teeth being inclined to the radial direction of the roller. The dye is contained in chamber 15 between the limitation walls 16, 17 which are provided at their bottom parts with sealing lips 18, 19. Sealing lip 19 situated behind the roller squeeqee has openings to allow air to flow into area 21. An outflow of dye through the tooth gaps 7 in the tangential direction with respect to the roller squeegee (which would be disadvantageous) is practically impossible since the tops of teeth 3 seal off the dye in the tooth gaps against the inside wall of the screen. In the pressure contact zone two adjacent teeth 3 are in complete contact with each other, thus completely closing the tooth gaps.

The effect according to the invention can also be obtained, when the roller squeegee having the inclined teeth is arranged not in a chamber 15 filled with dye, but when the supply of dye to the tooth gaps 3 is effected in some other way, e.g., (assuming the direction of rotation shown in FIGS. 1 and 2 of the roller squeegee) in that the dye may be poured into the tooth gaps of the left upper half of the roller squeegee. However, in this case also at least one limitation wall 16 is preferably provided for the purpose of sealing off the dye. The gaps between the teeth can also be filled with dye, by having the dye fed by a dye tube in a manner known per se. The advantage of chamber 15 according to FIG. 2 consists, however, in that virtually no dye can flow through the openings of the screen upon standstill of the roller squeegee, since teeth 3 of the roller squeegee tightly contact the limitation walls 16, 17, so that the dye which is above the roller squeegee cannot seep down.

The invention is furthermore limited neither to the magnetic contact pressure of the roller squeegee nor to the use of a rotary screen. Even when the roller squeegee is directly rolled onto the material to be printed without interposition of a screen which is the case when the material to be printed is coated with liquid or viscous dye, a chamber 15 as shown in FIG. 2 can preferably be used for feeding the dye to the roller squeegee.

What I claim is:

1. A printing machine for applying a viscous substance such as ink or dye under pressure onto a material, said machine comprising:

a surface for supporting the material to be printed;
   a perforated screen mounted to have one side thereof in contact with the material to be printed;
   a roller squeegee comprising a generally cylindrical body the peripheral surface of which includes a plurality of teeth made of resilient material; each of said teeth, in an undeformed state, extending in a direction substantially parallel to the rotational axis of said cylindrical body; the centerline of the cross-section of each tooth, taken along a plane perpendicular to said axis, being inclined with respect to the radius of said cylindrical body intersecting said centerline at the base of said tooth; and
   said roller squeegee being mounted on the side of said screen opposite said one side, with a portion only of said plurality of teeth being in contact with said at any one time screen, said portion of said plurality of teeth being deformed into contact with said peripheral surface by contact with said screen.

2. A machine as claimed in claim 1, wherein the distance between two adjacent teeth is greater than the thickness of each tooth, said distance and said thickness being measured along the circumference of said cylindrical body at a radius thereo corresponding to the bottom of each tooth.

3. A machine as claimed in claim 1, wherein the thickness of each tooth at the bottom and the top thereof as measured in said plane are substantially equal.

4. A machine as claimed in claim 1, wherein the distance between two adjacent teeth measured in the circumference direction of said cylindrical body at a radius thereof corresponding to the bottom of each tooth is substantially equal to the height of each tooth.

5. A printing machine for applying a viscous substance such as ink or dye uneer pressure onto a material, said machine comprising:

a surface for supporting the material to be printed;
   a perforated screen mounted to have one side thereof in contact with the material to be printed;
   a roller squeegee comprisng a generally cylindrical body the peripheral surface of which is provided with a plurality of teeth made of resilient material; each of said teeth, in an undeformed state, extending in a direction substantially parallel to the rotational axis of said cylindrical body; the centerline of the cross-section of each tooth, taken along a plane perpendicular to said axis, being inclined with respect to the radius of said cylindrical body intersecting said centerline at the base of said tooth, the distance between two adjacent teeth being greater than the thickness of each tooth, said distance and thickness being measured along the circumference of said cylindrical body at a radius thereof corresponding to the bottom of each tooth; said distance being substantially equal to the height of each tooth; and the thickness of each tooth at the bottom and top thereof, as measured in said plane, being substantially equal; and
   said roller squeegee being mounted on the side of said screen opposite said one side, with a portion only of said plurality of teeth being contact with said at any one time screen, said portion of said plurality of teeth being deformed into contact with said peripheral surface by contact with said screen.

* * * * *